US009140921B2

(12) United States Patent
Yakura

(10) Patent No.: US 9,140,921 B2
(45) Date of Patent: Sep. 22, 2015

(54) LIQUID CRYSTAL DISPLAY DEVICE AND METHOD OF MANUFACTURING THE SAME

(71) Applicant: Japan Display Inc., Tokyo (JP)

(72) Inventor: Masaki Yakura, Ishikawa-ken (JP)

(73) Assignee: Japan Display Inc., Tokyo (JP)

( * ) Notice: Subject to any disclaimer, the term of this patent is extended or adjusted under 35 U.S.C. 154(b) by 186 days.

(21) Appl. No.: 13/861,764

(22) Filed: Apr. 12, 2013

(65) Prior Publication Data

US 2013/0293823 A1 Nov. 7, 2013

(30) Foreign Application Priority Data

May 1, 2012 (JP) ................................ 2012-104692

(51) Int. Cl.
*G02F 1/1339* (2006.01)
*G02F 1/1333* (2006.01)
*G02F 1/1341* (2006.01)

(52) U.S. Cl.
CPC ........ *G02F 1/133365* (2013.01); *G02F 1/1339* (2013.01); *G02F 1/133351* (2013.01); *G02F 2001/13415* (2013.01)

(58) Field of Classification Search
CPC .................... G02F 1/133365; G02F 1/133351; G02F 1/1339; G02F 2001/13415
USPC .................................................. 349/153, 190
See application file for complete search history.

(56) References Cited

U.S. PATENT DOCUMENTS

| | | | |
|---|---|---|---|
| 2006/0139563 A1* | 6/2006 | Momose et al. | 349/190 |
| 2008/0002134 A1* | 1/2008 | Jeong | 349/153 |
| 2012/0242945 A1* | 9/2012 | Yamamoto | 349/153 |
| 2012/0320327 A1* | 12/2012 | Park et al. | 349/153 |

FOREIGN PATENT DOCUMENTS

JP 2009-276527 11/2009

* cited by examiner

*Primary Examiner* — Michael Caley
(74) *Attorney, Agent, or Firm* — Oblon, McClelland, Maier & Neustadt, L.L.P.

(57) ABSTRACT

In a method of manufacturing a liquid crystal display device, a seal material is formed by drawing on a first substrate. A starting point and a terminal point of the drawing overlap forming a closing portion. The seal material is obliquely drawn so as to depart from an active area as the drawing departs from the closing portion. After drawing the seal material so as to surround the active area, the seal material is obliquely drawn so as to close to the active area as the drawing closes to the closing portion. The liquid crystal material is dropped in the inside surrounded with the seal material. After that, a second substrate is arranged on the seal material and the liquid crystal material. Then, the first substrate and the second substrate are attached by curing the seal material.

25 Claims, 9 Drawing Sheets

LIQUID CRYSTAL DISPLAY DEVICE AND METHOD OF MANUFACTURING THE SAME

CROSS-REFERENCE TO RELATED APPLICATION

This application is based upon and claims the benefit of priority from prior Japanese Patent Application No. 2012-104692 filed May 1, 2012, the entire contents of which are incorporated herein by reference.

FIELD

Embodiments described herein relate generally to a liquid crystal display device and a method of manufacturing the same.

BACKGROUND

A liquid crystal display device is used in various fields of OA equipments such as a personal computer and a television set, taking advantage of the features such as light weight, thin shape, and low power consumption. In recent years, the liquid crystal display device is used also as displays for a portable remote terminal such as a cellular phone and a PDA (personal digital assistant), a car navigation equipment, and a game machine.

A One Drop Filling (ODF) method is put in practical use as one of the techniques of forming a liquid crystal display panel. In the ODF method, seal material is drawn in the shape of a frame. When the seal material is drawn from a starting point to a terminal point, it is demanded that the seal material may not break off between the starting point and the terminal point. Since the starting point and the terminal point of the seal material overlap, a closing portion used as a connecting portion of the seal material is formed. In the closing portion, since application quantity of the seal material increases more than other portions when a pair of substrates is pasted together, line width of the seal material expands locally.

Recently, it is demanded to make a frame portion small by enlarging the active area for displaying images with respect to an outside dimension of the liquid crystal display panel. Since the width between an end of the active area and a substrate end has a tendency to be reduced with the demand of the narrow frame which makes the surrounding frame size of the active area small. Accordingly, when the seal material expands locally, a portion of the seal material may flow into the active area resulting a poor display or on a planned cut line resulting a cutting defect of the substrates.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

Figure 1:
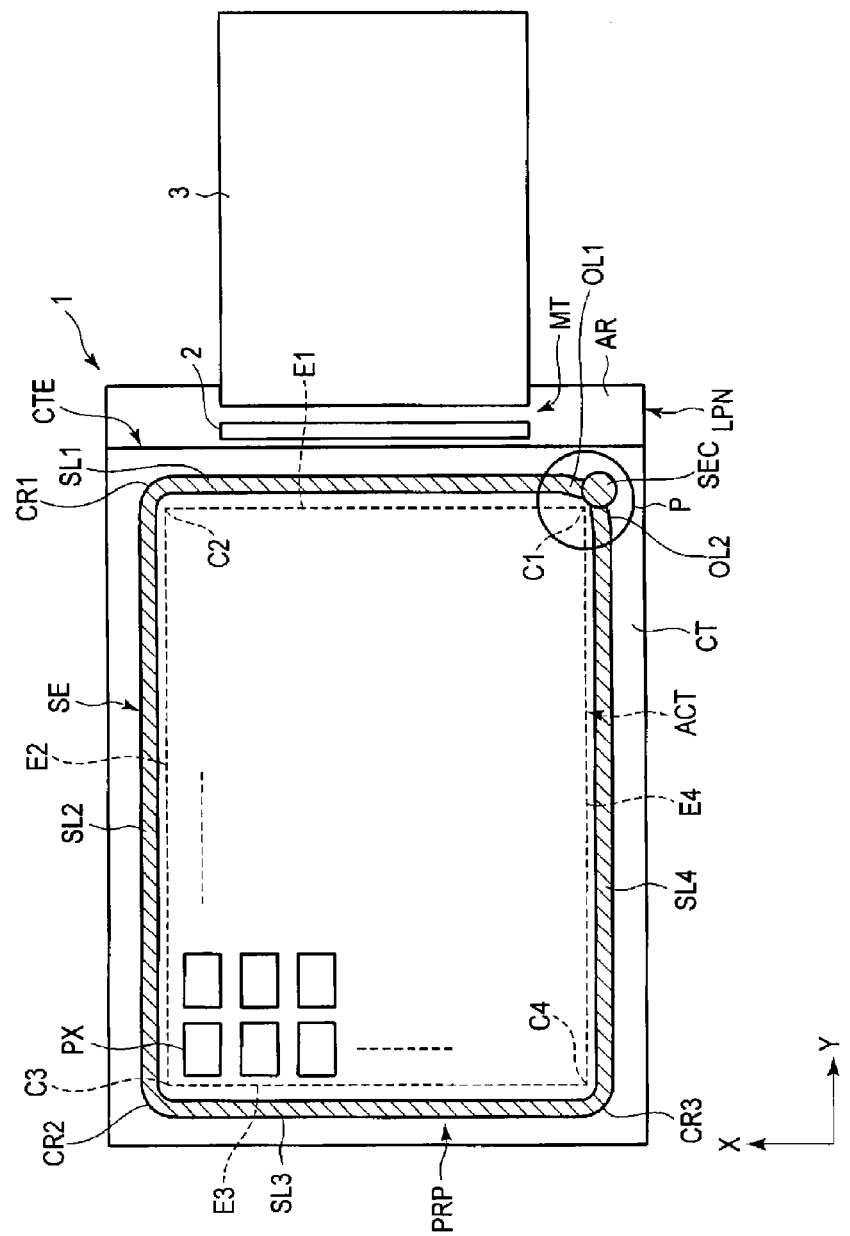
FIG. 1 is a view schematically showing a structure of the liquid crystal display device according to one embodiment.

A liquid crystal display device and a method of manufacturing the same according to an exemplary embodiment of the present invention will now be described with reference to the accompanying drawings wherein the same or like reference numerals designate the same or corresponding portions throughout the several views.

According to one embodiment, a method of manufacturing a liquid crystal display device includes the steps: preparing a first substrate including an active area substantially in the shape of a rectangle, a plurality of pixel electrodes arranged in a matrix shape in the active area; forming a seal material by; drawing the seal material in parallel with a first end of the active area after obliquely drawing so as to depart from the active area by setting an outside position of a first corner portion of the active area to a starting point, drawing the seal material in parallel with a second end of the active area after passing outside of a second corner portion of the active area, drawing the seal material in parallel with a third end of the active area after passing outside of a third corner portion of the active area, drawing the seal material in parallel with a fourth end of the active area after passing outside of a fourth corner portion of the active area, and obliquely drawing the seal material so as to close to the active area as the drawing closes to the first corner portion by setting a position which overlaps with the starting point to a terminal point after drawing the seal material in parallel with a fourth end of the active area, dropping liquid crystal material in the inside surrounded with the seal material; arranging a second substrate on the seal material and the liquid crystal material; and attaching the first substrate and the second substrate by curing the seal material.

According to other embodiment, a liquid crystal display device includes: a first substrate including an active area substantially in the shape of a rectangle, a plurality of pixel electrodes arranged in a matrix in the active area; a second substrate arranged facing the first substrate; a seal element in a rectangular closed loop surrounding the active area for attaching the first and second substrates while forming a cell gap therebetween including; a first line portion, a second line portion, a third line portion, and a fourth line portion, respectively, in parallel with a first end, a second end, a third end and a fourth end of the active area, a closing portion located outside of a first corner portion in which the first end and the fourth end of the active area cross, a first slant line portion connecting the closing portion with the first line portion and extending so as to depart from the active area as the seal element closes to the first line portion from the closing portion, and a second slant line portion connecting the closing portion and the fourth line portion and extending so as to depart from the active area as the seal element closes to the fourth line portion from the closing portion, and a liquid crystal layer held in the inside surrounded with the seal element and in a cell gap between the first substrate and the second substrate.

A liquid crystal display device 1 is equipped with a liquid crystal display panel LPN of an active-matrix type, a driving IC chip 2 connected to a flexible printed circuit substrate 3, etc.

The liquid crystal display panel LPN is equipped with an array substrate AR (first substrate), a counter substrate CT (second substrate) facing the array substrate AR and a liquid crystal layer held between the array substrate AR and the counter substrate CT. The array substrate AR and the counter substrate CT are attached by a seal material while a cell gap is maintained therebetween. The liquid crystal layer is held in the inside of the cell gap surrounded with the seal material.

The liquid crystal display panel LPN is equipped with an active area ACT in a rectangular shape for displaying images. The active area ACT is constituted by a plurality of pixels PX, and formed in the shape of a matrix of (m×n) pixels PX ("m" and "n" are positive integers). The active area ACT includes a first end E1 along a first direction X, a second end E2 connected with the first end E1 and extending in a second direction Y orthogonally crossing the first direction X, a third end E3 connected with the second end E2 and extending in the first direction X, and a fourth end E4 connected with the third end E3 and the first end E1 and extending in the second direction Y. Furthermore, the active area ACT includes a first corner portion C1 in which the first end E1 crosses the fourth end E4, a second corner portion C2 in which the first end E1 crosses the second end E2, a third corner portion C3 in which the second end E2 crosses the third end E3, and a fourth corner portion C4 in which the third end E3 crosses the fourth end E4.

Signal supply sources, such as the driving IC chip 2 and the flexible wiring substrate 3, are mounted in a mounting portion MT of the array substrate AR which extends outside a substrate end CTE of the counter substrate CT in a peripheral area PRP. The seal material SE is located in a peripheral area PRP outside the active area ACT. More specifically, the seal material SE is located between the active area ACT and the end of the counter substrate CT.

In this embodiment, the seal material SE is formed in the shape of an approximately rectangular frame surrounding the active area ACT and forming a closed loop. That is, an injecting mouth for injecting the liquid crystal material is not formed in the seal material SE. The seal material SE includes four straight line portions, i.e., a first straight line portion SL1, a second straight line portion SL2, a third straight line portion SL3, and a fourth straight line portion SL4. In the illustrated example, the first straight line portion SL1 is arranged in parallel with the first end E1 extending along the first direction X. The second straight line portion SL2 is arranged in parallel with the second end E2 extending along the second direction Y. The third straight line portion SL3 is arranged in parallel with the third end E3 extending along the first direction X. The fourth straight line portion SL4 is arranged in parallel with the fourth end E4 extending along the second direction Y.

Moreover, the seal material SE includes a closing portion SEC, a first slant line portion OL1, and a second slant line portion OL2. The closing portion SEC is located in the outside of the first corner portion C1. The first slant line portion OL1 connects the closing portion SEC with the first straight line portion SL1. Furthermore, the first slant line portion OL1 lineally extends to a side apart from the active area ACT as the first slant line portion OL1 closes to the first straight line portion SL1 from the closing portion SEC. The second slant line portion OL2 connects the closing portion SEC with the fourth straight line portion SL4. The second slant line portion OL2 lineally extends to a side apart from the active area ACT as the second slant line portion OL2 closes to the fourth straight line portion SL4 from the closing portion SEC.

Moreover, the seal material SE includes a first arc portion CR1, a second arc portion CR2, and a third arc portion CR3. The first arc portion CR1 is located in the outside of the second corner portion C2, and connects the first straight line portion SL1 and the second straight line portion SL2. The second arc portion CR2 is located in the outside of the third corner portion C3, and connects the second straight line portion SL2 and the third straight line portion SL3. The third arc portion CR3 is located in the outside of the fourth corner portion C4, and connects the third straight line portion SL3 and the fourth straight line portion SL4.

The line width of the seal material SE, i.e., the length in a direction orthogonally crossing the extending direction of the seal material SE is substantially uniform. For example, in the first to fourth straight line portions SL1 to SL4, the first slant line portion OL1 and the second slant line portion OL2, and the first to third arc portions CR1 to CR3, the line width thereof is substantially uniform, and a locally expanding portion is not formed. On the other hand, the line width of the seal material SE expands in the closing portion SEC. In the closing portion SEC, the line width locally expands more than edge portions of the first slant line portion OL1 and second slant line portion OL2 which sandwich the closing portion SEC.

The seal material SE is formed with ultraviolet curing type resin, etc., and applied by a system which draws the seal material SE from the starting point to the terminal point using a dispenser, etc. When the system is applied, it is demanded that the seal material SE is formed so that the seal material SE may not break off between the starting point and the terminal point. For this reason, the seal material SE is formed by being continuously applied from the starting point to the terminal point. Furthermore, the starting point of the seal material SE overlaps with the terminal point of the seal material SE. That is, the starting point and the terminal point of the seal material SE coincide substantially. Above mentioned closing portion SEC is formed in the portion in which the starting point and the terminal point of the seal material SE overlap.

That is, volume of the seal material SE applied to the positions of the starting point and the terminal point is more than the volume of other portions such as each straight line portion of the seal material SE. For example, the volume is about 1.5 times larger as compared with the volume of other portions of the seal material SE. For this reason, if pressure is applied to the seal material SE when pasting the array substrate AR and the counter substrate CT together, the seal material SE in the closing portion SEC spreads more than other portions of the seal material SE, and the seal material SE is formed in the shape as above mentioned.

A drawing method of the seal material SE is explained. In addition, when drawing the seal material SE, a dispenser may be moved with respect to the fixed substrate, and also the substrate may be moved with respect to the fixed dispenser.

First, after setting the dispenser to a position of the outside of the first corner portion C1, the application of the seal material SE is started by making the position into the starting point, and the drawing is obliquely carried out so as to keep away from the active area ACT. Thereby, the first slant line portion OL1 is formed. Then, an application orbit of the seal material SE goes straight in parallel with the first end E1. Thereby, the first straight line portion SL1 is formed. Then, the application orbit of the seal material SE passes along the outside of the second corner portion C2, and changes the course. At this time, the application orbit passing the outside of the second corner portion C2 is in an arc shape, and thereby, the first arc portion CR1 is formed.

Then, the application orbit of the seal material SE goes straight in parallel with the second end E2. Thereby, the second straight line portion SL2 is formed. Then, the application orbit of the seal material SE passes along the outside of the third corner portion C3, and changes the course. At this time, the application orbit passing the outside of the third corner portion C3 is in the shape of an arc. Thereby, the second arc portion CR2 is formed.

Then, the application orbit of the seal material SE goes straight in parallel with the third end E3. Thereby, the third straight line portion SL3 is formed. After that, the application orbit of the seal material SE passes the outside of the fourth corner portion C4, and changes the course. At this time, the application orbit passing the outside of the fourth corner portion C4 is in an arc shape. Thereby, the third arc portion CR3 is formed.

Then, the application orbit of the seal material SE goes straight in parallel with the fourth end E4. Thereby, the fourth straight line portion SL4 is formed. After that, the drawing is obliquely carried out so as to close to the active area ACT as the drawing closes to the first corner portion C1. Then, the position overlapping with the starting point becomes the terminal point. Thereby, the second slant line portion OL2 is formed. Furthermore, the closing portion SEC is formed in the position where the starting point overlaps with the terminal point.

Figure 2:
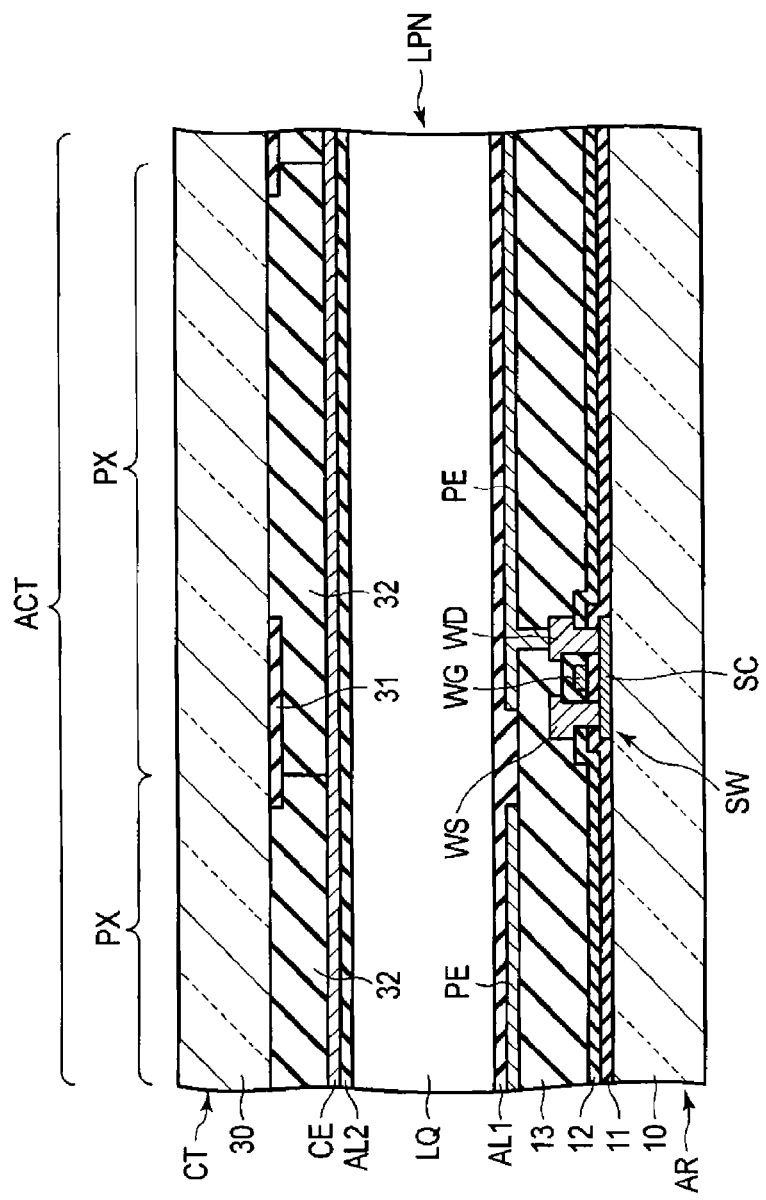
FIG. 2 is a cross-sectional view schematically showing a structure of an active area of the liquid crystal display panel shown in FIG. 1.

FIG. 2 is a cross-sectional view schematically showing a structure of an active area of a liquid crystal display panel shown in FIG. 1.

The array substrate AR constituting the liquid crystal display panel LPN is formed using a first insulating substrate 10 which has light transmissive characteristics such as a glass substrate and a plastic substrate. The array substrate AR includes a switching element SW, a pixel electrode PE, etc., on the first insulating substrate 10 facing the counter substrate CT.

The switching element SW shown here is constituted by an N channel type thin film transistor (TFT) of a bottom gated-type or a top gated-type. A semiconductor layer SC of the switching element SW is formed of poly-silicon or amorphous silicon, for example. The semiconductor layer SC is formed on the first insulating substrate 10 and covered with a first insulating layer 11. The first insulating layer 11 is arranged also on the first insulating substrate 10.

A gate electrode WG of the switching element SW is formed on the first insulating layer 11 and electrically connected with a gate line G which is not shown. The gate electrode WG is covered with a second insulating layer 12.

The second insulating layer 12 is arranged also on the first insulating layer 11. A source electrode WS and a drain electrode WD of the switching element SW are formed on the second insulating layer 12, and in contact with the semiconductor layer SC, respectively, through a contact hole penetrating the first insulating layer 11 and the second insulating layer 12. The source electrode WS is electrically connected with a source line S which is not shown. The source electrode WS and the drain electrode WD are covered with a third insulating layer 13. Moreover, the third insulating layer 13 is arranged also on the second insulating layer 12. The third insulating layer 13 is formed of various resin materials, such as ultraviolet curing resin and thermosetting resin, for example.

The pixel electrode PE is arranged in each pixel PX in the active area ACT. The pixel electrode PE is formed on the third insulating layer 13 and electrically connected with the drain electrode WD through a contact hole which penetrates the third insulating layer 13. The pixel electrode PE is covered with a first alignment film AL1.

On the other hand, the counter substrate CT constituting the liquid crystal display panel is formed using a second insulating substrate 30 which has light transmissive characteristics, such as the glass substrate and the plastic substrate. The counter substrate CT includes a black matrix 31, a color filter layer 32, the counter electrode CE, etc., on the second insulating substrate 30 facing the array substrate AR.

The black matrix 31 is formed on the second insulating substrate 30 between adjoining pixels PX in the active area ACT, and counters various wiring portions such as the switching element SW, the gate line G, the source line S formed on the array substrate AR. The color filter layer 32 is arranged in each pixel PX divided by the black matrix 31 in the active area ACT. The color filter layer 32 is arranged in each of pixel PX on the second insulating substrate 30, and a portion thereof overlaps with the black matrix 31.

In the active area ACT, the counter electrode CE is formed on the color filter layer 32 facing the array substrate AR and counters the pixel electrode PE of each pixel PX through the liquid crystal layer. The counter electrode CE is covered with a second alignment film AL2.

An overcoat layer may be arranged between the color filter layer 32 and the counter electrode CE to smooth unevenness of the color filter layer 32.

The array substrate AR and the counter substrate CT as mentioned above are arranged so that the first alignment film AL1 faces the second alignment film AL2. At this time, a spacer, for example, a pillar-shaped spacer integrally formed with one of the substrates by resin material is arranged between the array substrate AR and the counter substrate CT. Thereby, a predetermined cell gap is formed.

In addition, the structure of the liquid crystal display panel is not limited to that shown in FIG. 2, and the counter electrode CE may be formed on the array substrate AR with the pixel electrode PE. Also, regarding the liquid crystal mode, there is no restriction in particular. In addition, the modes which mainly use vertical electric field or slanting electric field such as TN (Twisted Nematic) mode, OCB (Optically Compensated Bend) and VA (Vertical Aligned) mode, and the modes which mainly use lateral electric field, such as IPS (In-Plane Switching) mode and FFS (Fringe Field Switching) mode, are applicable.

Moreover, although an optical element such as a polarization plate may be arranged on the external surfaces of the liquid crystal display panel LPN, i.e., the external surfaces of the array substrate AR and the counter substrate CT, the illustration is omitted here.

Figure 3:
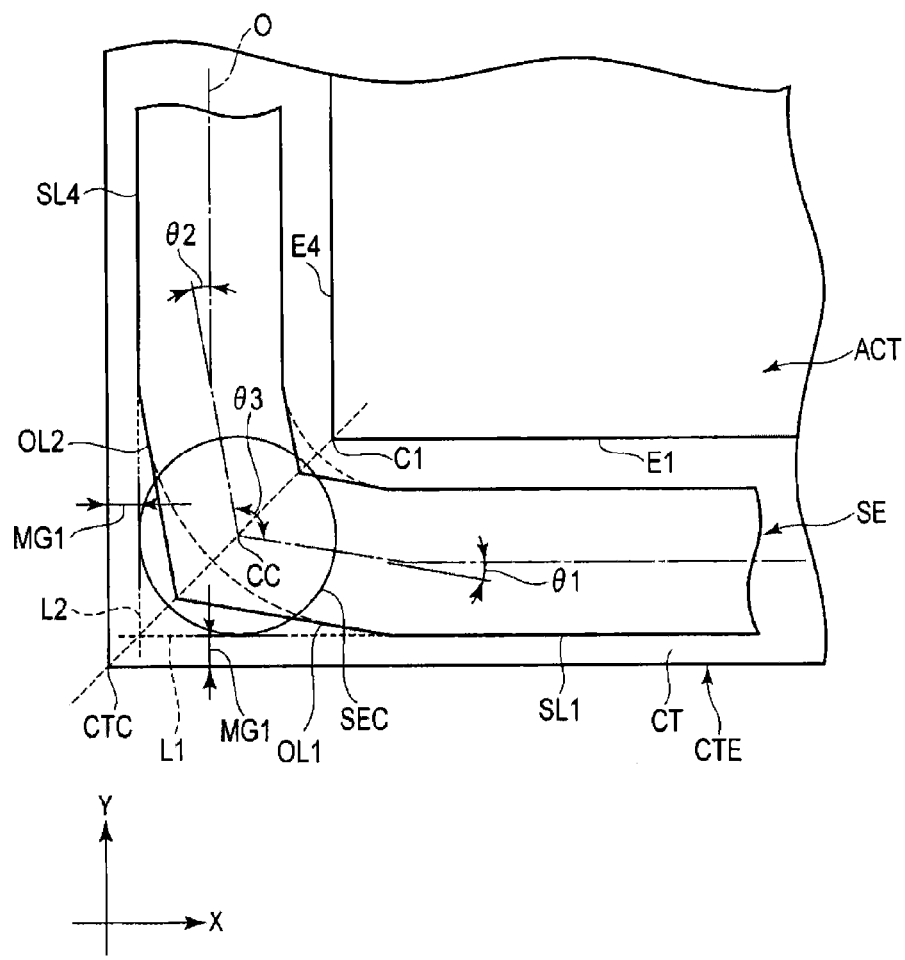
FIG. 3 is an enlarged view schematically showing a region P of the liquid crystal display panel shown in FIG. 1.

FIG. 3 is an enlarged view schematically showing a region P of the liquid crystal display panel shown in FIG. 1. In addition, in FIG. 3, the form of the seal material SE located between a substrate end CTE of the counter substrate CT and the active area ACT is illustrated concretely, and the illustration is omitted about structures unnecessary to the explanation. Moreover, one-point chain line O in the figure corresponds to a central line of the seal material SE and the application orbit at the time of applying the seal material SE.

In the seal material SE, the closing portion SEC is located between the first corner portion C1 of the active area ACT and the corner portion CTC of the counter substrate CT. The closing portion SEC is formed substantially in the shape of a circle in a X-Y plane, and a center thereof is located on a straight line which connects the first corner portion C1 and the corner portion CTC. The center CC substantially coincides with the position of the starting point and the terminal point at the time of applying the seal material SE.

An acute angle θ1 between the first slant line portion OL1 and the first straight line portion SL1 corresponds to an acute angle between the application orbit at the time of obliquely drawing from the starting point to form the first slant line portion OL1 and the application orbit at the time of drawing straight along the first end E1 to form the first straight line portion SL1. Moreover, an acute angle θ2 between the second slant line portion OL2 and the fourth straight line portion SL4 corresponds to an acute angle between the application orbit at the time of drawing straight along the fourth end E4 to form the fourth straight line portion SL4 and the application orbit at the time of obliquely drawing to the terminal point to form the second slant line portion OL2.

Both of the acute angles θ1 and θ2 are smaller than 45°, respectively. Preferably, the acute angles θ1 and θ2 are set in a range of 5° to 15°, and more preferably to set to 9° as an example.

When the acute angles θ1 and θ2 are set to the above range, the first slant line portion OL1 and the second slant line portion OL2 are not formed so as to cross orthogonally, respectively. That is, the first slant line portion OL1 and the second slant line portion OL2 are crooked toward the corner portion CTC, respectively. An angle θ3 between the first slant line portion OL1 and the second slant line portion OL2 becomes a blunt angle larger than 90° and smaller than 180°.

The outside edge of the first slant line portion OL1, i.e., edge facing the substrate end CTE opposite to the active area ACT departs from the active area ACT as the outside edge of the first slant line portion OL1 closes to the first straight line portion SL1 from the closing portion SEC or closes to the substrate end CTE. Similarly, the outside edge of the second slant line portion OL2 departs from the active area ACT as the outside edge of the second slant line portion OL2 closes to the fourth straight line portion SL4 from the closing portion SEC.

On the other hand, the outside edge of the closing portion SEC facing the substrate end CTE is located on an extension line L1 of the outside edge of the first straight line portion SL1 or inside the extension line L1, and on an extension line L2 of the outside edge of the fourth straight line portion SL4 or inside of the extension line L2. That is, the edge of the closing portion SEC is not protruded beyond the extension lines L1 and L2, i.e., to the substrate end CTE side. The interval between the closing portion SEC and the substrate end CTE is called a margin MG1.

Figure 4:
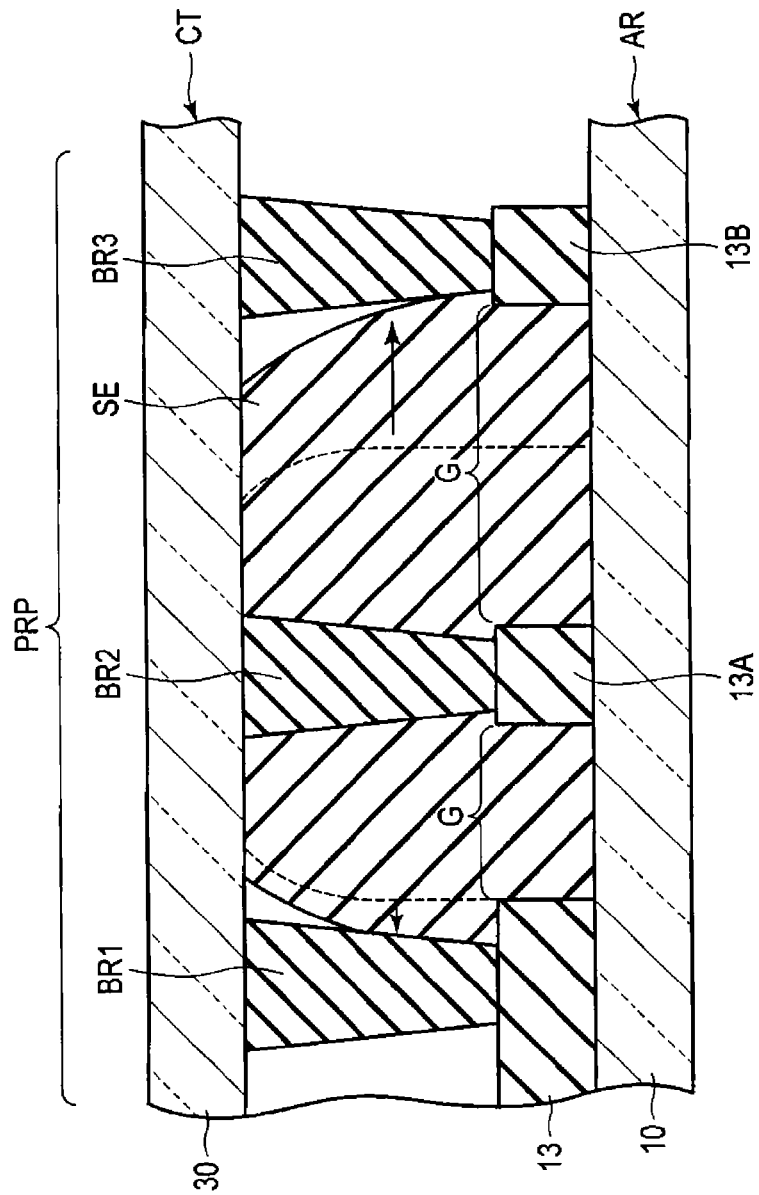
FIG. 4 is a cross-sectional view schematically showing the structure of the liquid crystal display panel shown in FIG. 3 taken along line in a direction orthogonally crossing an extending direction of the seal material.

FIG. 4 is a cross-sectional view schematically showing the structure of the liquid crystal display panel shown in FIG. 3 taken along line in a direction orthogonally crossing an extending direction of the seal material SE. The left-hand side of the figure is an active area ACT side, and the right-hand side of the figure is the substrate end CTE side. In addition, the case where the pillar-shaped spacer is provided on the counter substrate CT side is explained as an example here.

The counter substrate CT includes a plurality of barriers BR. The barriers BR are formed at intervals toward the substrate end CTE side from the active area ACT side. In the illustrated example, barriers BR1, BR2, and BR3 are arranged in this order in a line toward the substrate end side from the active area ACT side. The barriers BR1 to BR3 can be formed with the same material as the pillar-shaped spacer which is omitted illustration, such as photosensitive resin material.

In the array substrate AR, the third insulating layer 13 extends from the active area ACT side. A groove G is formed in the third insulating layer 13 in the peripheral area PRP. Portions 13A and 13B formed in the shape of an island in the third insulating layers 13 function as seats for the barriers BR.

Although the barrier BR may touch the counter substrate CT, or may not touch the counter substrate CT, the barrier BR has a function which controls the spread of the seal material SE.

Immediately after applying the seal material SE near the groove G formed in the third insulating layer 13 on the array substrate AR, as shown in a dashed line in the figure, the seal material SE is located in general on the barrier BR2 side. When the counter substrate CT is pasted to the array substrate AR together, the seal material SE is crushed and spreads, respectively, in the direction which intersects perpendicularly with the application orbit of the seal material SE, i.e., on the active area ACT side and the substrate end side. At this time, the application orbit and the amount of application of the seal material SE are designed so that the seal material SE neither flows into the active area ACT nor spreads to the substrate end when the seal material SE spreads. In addition, the seal material SE spreading toward the left side in the figure, i.e., active aria ACT side is dammed up by the plurality of barriers BR1, etc. Moreover, the seal material SE which spreads toward the right-hand side in the figure (substrate end side) is dammed up by the barrier BR3, etc.

Therefore, when the seal material SE in the first to fourth straight line portions, the first to third arc portions, and the first slant line portion OL1 and the second slant line portion OL2 spread, the penetration of the seal material SE to the active area ACT and the substrate end is suppressed.

On the other hand, since the amount of application of the seal material SE in the closing portion SEC increases rather than other portions of the seal material SE, there is a tendency that the seal material SE spreads more than other portions. In the closing portion SEC, while the spread to the active area ACT side or the penetration to the active area ACT is controlled with the barrier BR as above-mentioned, the penetration to the substrate end may be resulted. The substrate end corresponds to the position for cutting a large-sized mother substrate into respective liquid crystal panels LPN. That is, if the seal material SE reaches to the cutting line of the large-sized substrate, when cutting the large-sized substrate, cutting default such as breaks of the substrate end and incomplete cutting may be resulted.

According to this embodiment, the seal material SE which forms a closed loop includes the closing portion SEC formed in the position in which the starting point and the terminal point overlap, the first slant line portion OL1 extending so as to keep away from the active area ACT as the seal material SE closes from the closing portion SEC to the first straight line portion SL1 and connecting the closing portion SEC with the first straight line portion SL1, and a second slant line portion OL2 extending so as to keep away from the active area ACT as the seal material SE closes from the closing portion SEC to the fourth straight line portion SL4 and connecting the closing portion SEC with the fourth straight line portion SL4. For this reason, it becomes possible to arrange the closing portion SEC more adjacent to the active area ACT than to the substrate end. Thereby, the margin MG1 between the edge of the seal material SE and the substrate end can be made larger, and even if the closing portion SEC spreads greatly toward the substrate end side, it becomes possible to control the penetration of the seal material SE to the substrate end.

As shown in FIG. 4, although the seal material SE spreads more on the substrate end side rather than on the active area ACT side sandwiching the application position, the spreading distance is sufficiently smaller than the distance between the application position and the substrate end. Therefore, the edges of the spreading seal material SE are located between the active area ACT and the substrate end without contacting them. For this reason, it becomes possible to control generating of poor cutting at the time of taking out the liquid crystal display panels from the large-sized substrate. Thereby, it becomes possible to control the fall of the manufacturing yield.

Here, the seal material SE of other form is explained as a comparative example.

Figure 5:
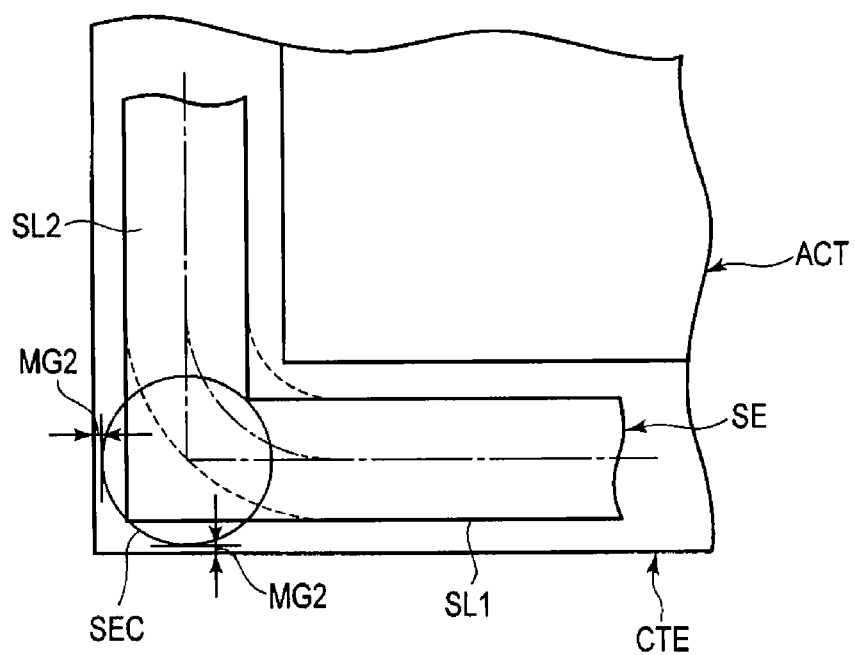
FIG. 5 is a plan view showing other shape (comparative example) of the seal material arranged between an end of the substrate and the active area.

FIG. 5 is a plan view showing other form of the seal material SE located between the substrate end and the active area ACT.

The example shown in FIG. 5 is different as compared with the example shown in FIG. 3 in that the seal material SE does not have the first slant line portion OL1 and the second slant line portion OL2. That is, the example shown here corresponds to the case in which both of the acute angles θ1 and θ2 are 0°. In this case, the closing portion SEC is formed in the position where the first straight line portion SL1 and fourth straight line portion SL4 cross. For this reason, although the position of the closing portion SEC keeps away from the active area ACT as compared with the example shown in FIG. 3, the position of the closing portion SEC more closes to the substrate end. Therefore, the margin MG2 between the edge of the closing portion SEC and the substrate end becomes smaller than the margin MG1. Accordingly, when the closing portion SEC spreads, a portion of the seal material SE easily spreads to the substrate end. That is, when cutting out the liquid crystal display panels from the large-sized substrate, the generating of cutting defect may be resulted.

Figure 6:
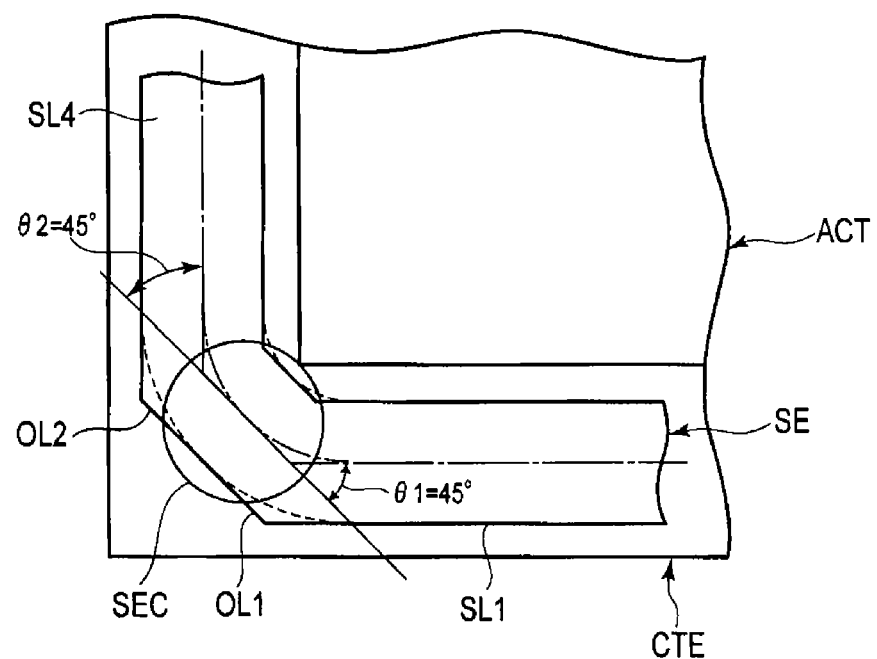
FIG. 6 is a plan view showing other shape (comparative example) of the seal material arranged between the end of the substrate and the active area.

FIG. 6 is a plan view showing other form of the seal material SE located between the substrate end and the active area ACT.

The example shown in FIG. 6 is different as compared with the example shown in FIG. 3 in that both of the acute angles θ1 and θ2 are set to 45°. In this case, although the position of the closing portion SEC keeps away from the substrate end as compared with the example shown in FIG. 3, the position of the closing portion SEC more closes to the active area ACT. For this reason, when the closing portion SEC spreads, there is a possibility that a portion of the seal material SE may flow into the active area ACT, and the generating of display defect may be resulted.

According to this embodiment, both of the acute angles θ1 and θ2 are set larger than 0° and smaller than 45°. For this reason, the position of the closing portion SEC is apart from the active area ACT, and also apart from the substrate end in an extent that the margin MG1 to the substrate end can be secured. According to this embodiment, when the acute angles θ1 and θ2 are set to approximately 9°, the margin MG1 can be secured about 8 times larger than the margin MG2 shown in FIG. 5. Therefore, it becomes possible to control the generating of cutting defect of the substrate and display defect resulted from the spread of the seal material SE.

Next, the manufacturing method of the above-mentioned liquid crystal display panel LPN is explained.

Figure 7:
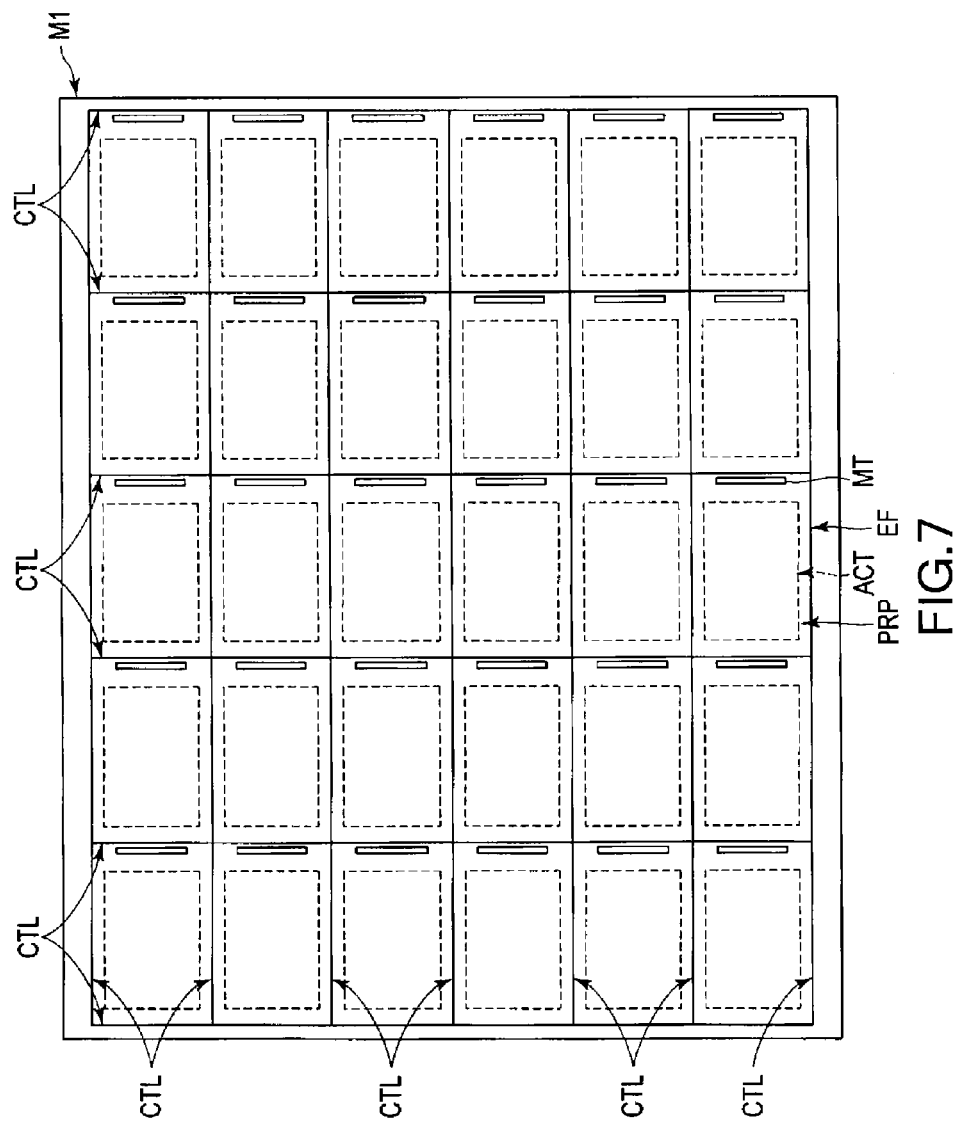
FIG. 7 is a plan view showing a method of manufacturing the liquid crystal display panel according to this embodiment, and specifically showing a plan view of a process for preparing a first mother substrate.

First, as shown in FIG. 7, a first mother substrate M1 for forming the array substrate AR is prepared. Effective areas EF for forming a plurality of array substrates AR are formed in the first mother substrate M1. In addition, in this embodiment, although the first mother substrate M1 has thirty (5×6) effective areas EF, the number of the effective areas EF is not limited to this value.

Moreover, "CTL" in the illustrated first mother substrate M1 is a planned cutting line to cut the first mother substrate M1 when the respective array substrates AR are taken out from the first mother substrate M1 later. Each of the effective areas EF is the area surrounded by the planned cut lines CTL.

The first mother substrate M1 is formed using an insulating substrate which forms the first insulating substrate 10. Each of the effective areas EF includes the mounting portion MT for mounting various insulating films such as the first to third insulating layers, the switching element SW, the pixel electrode PE, the driving IC chip 2, and the flexible wiring substrate 3, etc, though detailed illustration is omitted. The switching element SW, the pixel electrode PE, etc., are formed in the active area ACT. The mounting portion MT is formed in the peripheral area PRP.

Although not illustrated, on the other hand, a second mother substrate M2 for forming the counter substrate CT is prepared. The size of the second mother substrate M2 is substantially the same as the first mother substrate M1, for example.

Figure 8:
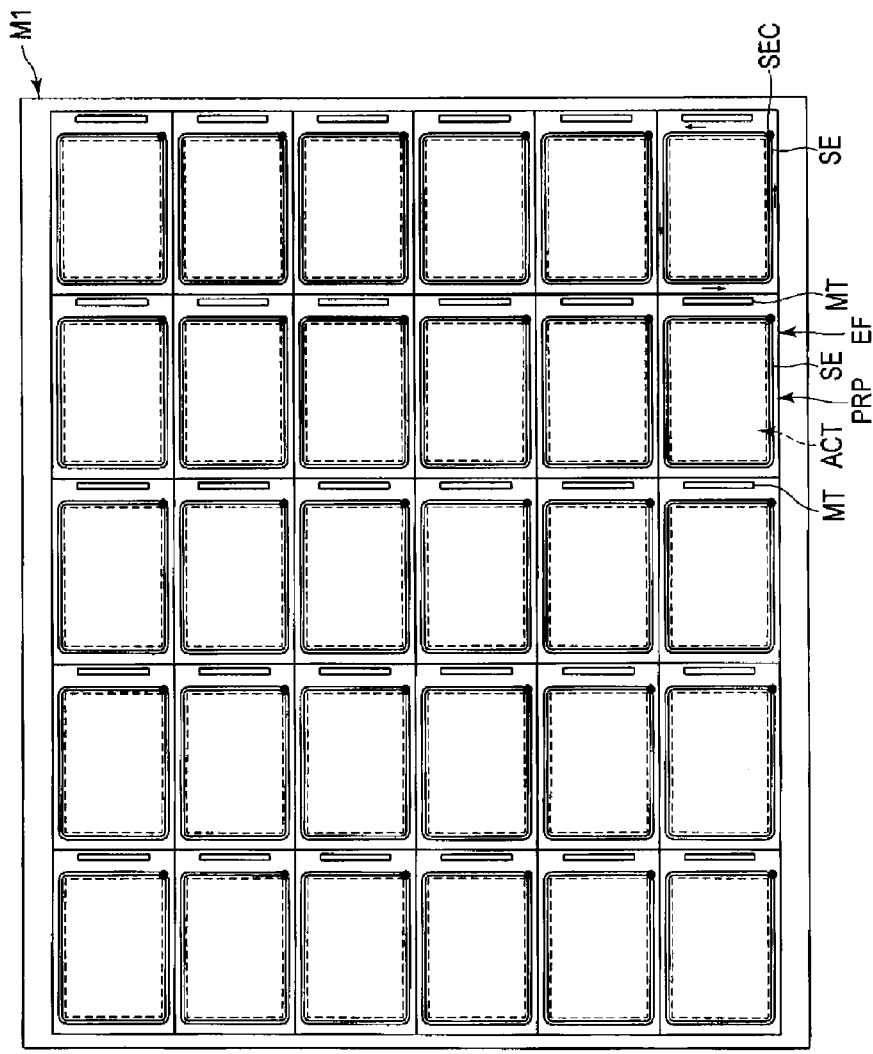
FIG. 8 is a plan view showing the method of manufacturing the liquid crystal display panel according to this embodiment, and specifically showing a plan view of a process for drawing the seal material on the first mother substrate.

Then, as shown in FIG. 8, on the first mother substrate M1, the seal material SE is drawn in each of the effective areas EF using a dispenser. At this time, the position shown by a filled circle in the figure corresponds to the closing portion SEC. That is, the drawing of the seal material SE is continuously performed by starting from the position corresponding to the closing portion SEC along the direction indicated by an arrow in the figure so that a closed loop formed of an approximately rectangular frame surrounds the active area ACT. The application of the seal material SE returns to the position corresponding to the closing portion SEC and ends. The detailed drawing method of the seal material SE is as described above.

Figure 9:
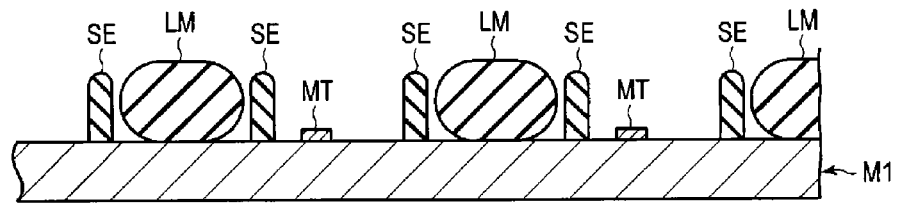
FIG. 9 is a plan view showing a method of manufacturing the liquid crystal display panel according to this embodiment, and specifically showing a plan view of a process for dropping liquid crystal material on the first mother substrate.

Then, as shown in FIG. 9, the liquid crystal material LM is dropped in the inner side surrounded by the seal material SE in each of the effective areas EF on the first mother substrate M1. At this time, the liquid crystal material LM is arranged on the first alignment film 20 in the respective effective areas EF.

Figure 10:
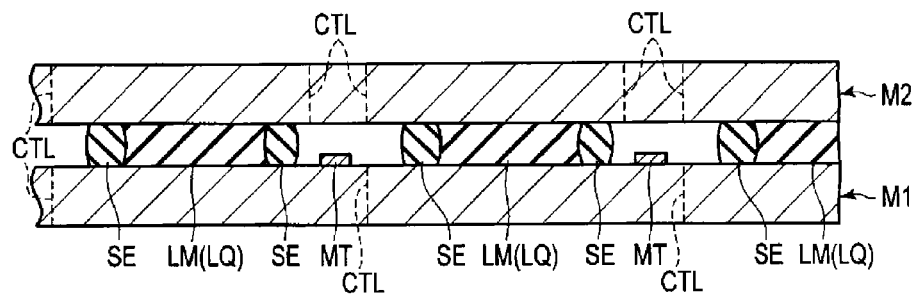
FIG. 10 is a plan view showing a method of manufacturing the liquid crystal display panel according to this embodiment, and specifically showing a plan view of a process for attaching the first mother substrate and a second mother substrates.

After that, as shown in FIG. 10, the second mother substrate M2 is laid on the seal material SE and the liquid crystal material LM on the first mother substrate M1, and pressure is applied so that a predetermined cell gap is formed between the first mother substrate M1 and the second mother substrate M2. At this time, the applied seal material SE is crushed, and spreads in the inner side surrounded by the seal material SE. Then, while curing the seal material SE and pasting together the first mother substrate M1 and the second mother substrate M2, the liquid crystal layer LQ is formed between the first mother substrate M1 and the second mother substrate M2 in each of the effective areas EF.

Figure 11:
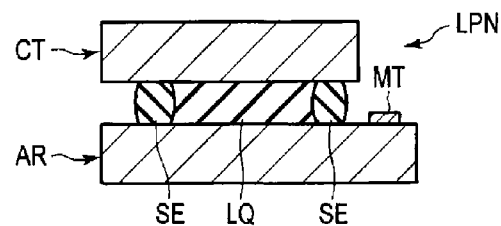
FIG. 11 is a plan view showing a method of manufacturing the liquid crystal display panel according to this embodiment, and specifically showing a plan view of a process for cutting the first and second mother substrates into respective liquid crystal display panels.

Subsequently, both of the first mother substrate M1 and the second mother substrate M2 are cut along the planned cut lines CTL. As shown in FIG. 11, while the array substrates AR are taken out from the first mother substrate M1, the counter substrates CT are taken out from the second mother substrate M2. Thereby, the liquid crystal display panel LPN holding the liquid crystal layer LQ between array substrate AR and the counter substrate CT is manufactured.

In addition, a process of inspecting existence of an excessive spread of the seal material SE may be added after the process of pasting the array substrate AR and the counter substrate CT together. That is, a sheet is prepared, in which a first straight line in parallel to the application orbit at the time of forming the first straight line portion SL1 and the second straight line in parallel to the application orbit at the time of forming the fourth straight line portion SL4 of the seal material SE. Then, the first straight line is aligned with the outside edge of the first straight line portion SL1 facing the substrate end at the time when the first straight line portion SL1 spreads after the first mother substrate M1 and the second mother substrate M2 are pasted together. Further, the second straight line is aligned with the outside edge of the fourth straight line portion SL4 facing the substrate end CTE at the time when the fourth straight line portion SL4 spreads. Thereby, it becomes possible to judge whether the seal material SE in the closing portion SEC more spreads outside, i.e., on the substrate end side, than the first straight line portion SL1 and the fourth straight line portion SL4.

Thus, according to this embodiment, when the application of the seal material SE is carried out in the closing portion SEC, the amount of application increases more as compared with other portions by the applied pressure when pasting the first mother substrate M1 and the second mother substrate M2 together. However, it becomes possible to suppress the penetration of the seal material SE to the active area ACT and the planned cut line. Especially, also in the liquid crystal display panel LPN of the narrow frame specification in which the distance between the active area ACT and the substrate end CTE is comparatively small, it becomes possible to control the excessive spread in the closing portion SEC. Thereby, the generating of display defect and cutting default due to the spread of the seal material SE is suppressed.

As explained above, according to this embodiment, the liquid crystal display device and the manufacturing method thereof can be supplied, in which the fall of the manufacturing yield can be suppressed.

While certain embodiments have been described, these embodiments have been presented by way of example only, and are not intended to limit the scope of the inventions. In practice, the structural and method elements can be modified without departing from the spirit of the invention. Various embodiments can be made by properly combining the structural and method elements disclosed in the embodiments. For example, some structural and method elements may be omitted from all the structural and method elements disclosed in the embodiments. Furthermore, the structural and method elements in different embodiments may properly be combined. The accompanying claims and their equivalents are intended to cover such forms or modifications as would fall with the scope of the inventions.

What is claimed is:

1. A method of manufacturing a liquid crystal display device, comprising the steps:
    preparing a first substrate including an active area substantially in the shape of a rectangle, a plurality of pixel electrodes arranged in a matrix shape in the active area;
    forming a seal material by;
        drawing the seal material in parallel with a first end of the active area after obliquely drawing so as to depart from the active area by setting an outside position of a first corner portion of the active area to a starting point,
        drawing the seal material in parallel with a second end of the active area after passing outside of a second corner portion of the active area,
        drawing the seal material in parallel with a third end of the active area after passing outside of a third corner portion of the active area,
        drawing the seal material in parallel with a fourth end of the active area after passing outside of a fourth corner portion of the active area, and
        obliquely drawing the seal material so as to close to the active area as the drawing closes to the first corner portion by setting a position which overlaps with the starting point to a terminal point after drawing the seal material in parallel with a fourth end of the active area, wherein the seal material is drawn in a crooked shape apart from the first corner portion,
    dropping liquid crystal material in the inside surrounded with the seal material;
    arranging a second substrate on the seal material and the liquid crystal material; and
    attaching the first substrate and the second substrate by curing the seal material.

2. The method of manufacturing a liquid crystal display device according to claim 1, wherein a first acute angle between a first application orbit at the time of obliquely drawing the seal material from the starting point and a second application orbit at the time of drawing the seal material in parallel with the first end, and a second acute angle between a third application orbit at the time of drawing the seal material in parallel with the fourth end and a fourth application orbit at the time of obliquely drawing the seal material to the terminal point is smaller than 45°, respectively.

3. The method of manufacturing a liquid crystal display device according to claim 2, wherein the first and second acute angles are in a range of 5° to 15°, respectively.

4. The method of manufacturing a liquid crystal display device according to claim 3, further comprising the steps after the first and second substrates have been attached;
    preparing a sheet in which a first straight line in parallel with the second application orbit and a second straight line in parallel with the third application orbit are drawn, respectively, and
    inspecting whether the seal material in a closing portion in which the starting point and the terminal point overlap spreads more adjacent to ends of the second substrate than the seal material along the second application orbit and the third application orbit.

5. The method of manufacturing a liquid crystal display device according to claim 1, wherein a shape of an application orbit in the outside of the second, third, and fourth corner portions of the active area is formed in an arc shape.

6. The method of manufacturing a liquid crystal display device according to claim 1, wherein line width of the seal material is larger at a position in which the starting point overlaps with the terminal point than other positions.

7. The method of manufacturing a liquid crystal display device according to claim 1, wherein obliquely drawing comprises:
    drawing the seal material at an oblique angle with respect to a direction of the seal material drawn in parallel with the fourth end of the active area; and
    drawing the seal material with a width substantially the same as a width of the seal material drawn in parallel with the fourth end of the active area.

8. The method of manufacturing a liquid crystal display device according to claim 1, wherein obliquely drawing comprises:

drawing a first portion of the seal material at a first oblique angle from the seal material drawn in parallel with the fourth end of the active area towards the first corner portion; and drawing a second portion of the seal material from the first portion to the seal material drawn in parallel with the first end of the active area at a second oblique angle; and drawing the first and second portions with a width substantially the same as a width of the seal material drawn in parallel with the fourth end of the active area, wherein the first oblique angle and the second oblique angle each have a same range of angle with respect to directions of the seal material drawn in parallel with the fourth end and first end, respectively.

9. The method of manufacturing a liquid crystal display device according to claim 8, wherein the range is 5 to 15 degrees.

10. The method of manufacturing a liquid crystal display device according to claim 8, wherein the first and second oblique angles are each about 9 degrees.

11. A method of manufacturing a liquid crystal display device, comprising the steps:

preparing a first substrate formed of a plurality of array substrates each including an active area substantially in the shape of a rectangle, and a plurality of pixel electrodes arranged in the active area in a matrix shape;

forming a seal material in each array substrate by;

drawing the seal material in parallel with a first end of the active area after obliquely drawing so as to depart from the active area by setting an outside position of a first corner portion of the active area to a starting point, drawing the seal material in parallel with a second end of the active area after passing outside of a second corner portion of the active area, drawing the seal material in parallel with a third end of the active area after passing outside of a third corner portion of the active area, drawing the seal material in parallel with a fourth end of the active area after passing outside of a fourth corner portion of the active area, and obliquely drawing the seal material so as to close to the active area as the drawing closes to the first corner portion by setting a position which overlaps with the starting point to a terminal point after drawing the seal material in parallel with a fourth end of the active area, wherein the seal material is drawn in a crooked shape apart from the first corner portion, dropping liquid crystal material in the inside surrounded with the seal material;

preparing a second substrate formed of a plurality of counter substrates facing the respective array substrates;

arranging the second substrate on the seal material and the liquid crystal material;

attaching the first substrate and the second substrate by curing the seal material; and cutting the first substrate and the second substrate to form a plurality of display panels each constituted by the array substrate and the counter substrate.

12. The method of manufacturing a liquid crystal display device according to claim 11, wherein a first acute angle between a first application orbit at the time of obliquely drawing the seal material from the starting point and a second application orbit at the time of drawing the seal material in parallel with the first end, and a second acute angle between a third application orbit at the time of drawing the seal material in parallel with the fourth end and a fourth application orbit at the time of obliquely drawing the seal material to the terminal point is smaller than 45°, respectively.

13. The method of manufacturing a liquid crystal display device according to claim 12, wherein the first and second acute angles are in a range of 5° to 15°, respectively.

14. The method of manufacturing a liquid crystal display device according to claim 11, wherein the shape of an application orbit in the outside of the second, third, and fourth corner portions of the active area is formed in an arc shape.

15. The method of manufacturing a liquid crystal display device according to claim 11, wherein line width of the seal material is larger at a position in which the starting point overlaps with the terminal point than other positions.

16. A liquid crystal display device, comprising:

a first substrate including an active area substantially in the shape of a rectangle, a plurality of pixel electrodes arranged in a matrix in the active area;

a second substrate arranged facing the first substrate;

a seal element in a rectangular closed loop surrounding the active area for attaching the first and second substrates while forming a cell gap therebetween including;

a first line portion, a second line portion, a third line portion, and a fourth line portion, respectively, in parallel with a first end, a second end, a third end and a fourth end of the active area, a closing portion located outside of a first corner portion in which the first end and the fourth end of the active area cross, a first slant line portion connecting the closing portion with the first line portion and extending so as to depart from the active area as the seal element closes to the first line portion from the closing portion, and a second slant line portion connecting the closing portion and the fourth line portion and extending so as to depart from the active area as the seal element closes to the fourth line portion from the closing portion, wherein the first and second slant line portions are formed in a crooked shape apart from the first corner portion, and a liquid crystal layer held in the inside surrounded with the seal element and in a cell gap between the first substrate and the second substrate.

17. The liquid crystal display device according to claim 16, wherein a first acute angle between the first slant line portion and the first line portion and a second acute angle between the second slant portion and the fourth line portion are smaller than 45°, respectively.

18. The liquid crystal display device according to claim 17, wherein the first and second acute angles are in a range of 5° to 15°, respectively.

19. The liquid crystal display device according to claim 16, wherein the seal element includes a first arc portion connecting the first line portion with the second line portion, a second arc portion connecting the second line portion with the third line portion, and a third arc portion connecting the third line portion with the fourth line portion.

20. The liquid crystal display device according to claim 16, wherein line width of the seal material in the closing portion is larger than other portions.

21. The liquid crystal display device according to claim 20, wherein the edge of the seal material facing an end of the second substrate in the closing portion is located inside of an extension line of a first edge of the first line portion facing the end of the second substrate, and inside of an extension line of a second edge of the fourth line portion facing the end of the second substrate.

22. The liquid crystal display device according to claim 16, wherein an angle between the first slant line portion and the second slant line portion is set a blunt angle larger than 90° and smaller than 180°.

23. The liquid crystal display device according to claim 16, wherein the first and second slant line portions have a width substantially the same as a width of the fourth line portion.

24. The liquid crystal display device according to claim 16, wherein the second slant line portion is connected to the first line portion and the first slant line portion.

25. A liquid crystal display device, comprising:
- a first substrate including an active area substantially in the shape of a rectangle, a plurality of pixel electrodes arranged in a matrix in the active area;
- a second substrate arranged facing the first substrate;
- a seal element in a rectangular closed loop surrounding the active area for attaching the first and second substrates while forming a cell gap therebetween including;
- a first line portion, a second line portion, a third line portion, and a fourth line portion, respectively, in parallel with a first end, a second end, a third end and a fourth end of the active area, and
- a closing portion located outside of a first corner portion in which the first end and the fourth end of the active area cross; and
- a liquid crystal layer held in the inside surrounded with the seal element and in a cell gap between the first substrate and the second substrate, wherein the closing portion comprises:
- a first slant line portion connected to the first line portion and extending from the first line portion to the fourth line portion and
- a second slant line portion connected to the first slant line portion and the fourth line portion.

* * * * *